Jan. 24, 1956 R. C. MINNICK 2,732,542

READ-OUT ARRANGEMENT FOR A MAGNETIC CORE MATRIX

Filed Sept. 13, 1954

INVENTOR
R.C. MINNICK
BY [signature]
ATTORNEY 2,732,542

READ-OUT ARRANGEMENT FOR A MAGNETIC CORE MATRIX

Robert C. Minnick, Marlboro, Mass., assignor to Bell Telephone Laboratories, Incorporated, New York, N. Y., a corporation of New York Application September 13, 1954, Serial No. 455,659

14 Claims. (Cl. 340—174)

This invention relates to magnetic core circuits and more particularly to the output wire arrangements of magnetic core matrices.

In magnetic core matrices, information is stored by switching or setting the magnetic state of a single core in the array during a particular time interval; this is done by pulsing selection wires which all thread or intersect only that one core. Subsequently the information is read out by sensing that core; this is done by applying sensing pulses to the particular selection wires to switch the state of the core again, if information had been stored, and cause an output pulse to appear on a read-out or output wire that also threads the core. As only one core is sensed at a time and thus any information appearing on the read-out or output wire must be applicable to the core that was sensed, it has become usual to have but a single read-out wire thread or intersect all the cores in the array.

It is possible, however, to have the information appearing on the read-out wire erroneous. Let us consider first that the partial pulses applied to the selection wires threading others than the selected core are sufficient to affect the state of those cores; as pointed out in application Serial No. 401,465, filed December 31, 1953, of R. L. Ashenhurst and R. C. Minnick, these partial pulses, particularly if applied repetitively, may change the state of the core, even though the magnetic state is not completely switched, so that the information stored therein cannot be read out properly. As described in the above-mentioned application, the effects of these partial pulses on the individual cores may be rendered negligible, so that masking or destruction of the information stored in a core does not occur, by threading each core with a number of wires to each of which is applied an equal part of the setting current desired. Further, the sets of selection wires are threaded through the cores so that no two selection wires jointly thread more than one core in the array. In this manner, the disturbing current applied to any core is limited to just $1/p$ the setting current, considering there to be $p$ sets of selection wires. As more fully discussed in the above-mentioned application, this can be attained in an $n$ by $n$ matrix if a first group of wires thread each core in a row in the $a$ coordinate direction, a second group of wires thread each core in a column in the $b$ coordinate direction, and a plurality of other groups of wires each thread the cores. The wires of the other groups have slopes such that for any two wires whose slopes are defined by the pairs $(a, b)$ and $(a', b')$, the difference $(ab'—ba')$ has no common factor with $n$ and is not zero. If the array of magnetic cores is defined by holes through a sheet of magnetic material, as described in the above-mentioned Ashenhurst-Minnick application, or by laminated magnetic cores formed of toroidal wafers each mounted on an insulating card, as described in application Serial No. 455,658, filed September 13, 1954 of R. C. Minnick, there is another criterion for acceptable wires in the storage matrix, namely, that the interval in the $a$ direction plus the interval in the $b$ direction between successive cores threaded by a selection wire is constant and odd, except where an edge of the matrix is traversed between successive cores.

By following the teaching of the above-mentioned Ashenhurst-Minnick application the information stored in the individual cores in the matrix will not be destroyed on successive storing and sensing of other cores in the array. However, even though the information stored in any one core will not be destroyed by these disturbing pulses applied to the other cores in the array, the pulses induced in the single read-out wire threading all the cores due to these disturbing pulses themselves may be sufficient to mask the output pulse read from the sensed core. The first source of erroneous output pulses, discussed above, is due to change in the magnetic state of the core; this source of erroneous pulses is due to the coupling between the selection and read-out wires. As the number of groups of selection wires is increased to prevent destruction of the information stored in any one core, as taught by the Ashenhurst-Minnick application, the total number of cores to which disturbing pulses are applied when a single core is sensed is increased and while the effect on the single read-out wire of the disturbing pulse at one of these other cores is very small, the summation of all these small effects may be of such a value as to mask the proper signal on the read-out wire from the sensed core.

In accordance with an aspect of this invention, accumulation of small error signals on the read-out wire which could mask the output signal is avoided by threading the read-out wire through the cores in the matrix such that, for the sensing of any core in the matrix, the pulses induced on the read-out wire by the disturbing pulses largely, if not completely, cancel each other. This is attained by having the read-out wire intersect certain of the cores in the matrix in the same direction as the selection wires through these cores and to intersect other cores in the matrix in the opposite direction, whereby the polarity of the error pulses induced on the read-out wire substantially alternates.

Before describing various features of this invention it will be advantageous to consider certain aspects of the invention and to define certain terms to enable us to specify the criteria on the threading of the read-out wire in accordance with this invention to attain substantial cancellation of these error pulses on the read-out wire. These may best be considered together with the accompanying drawing, in which.

In small magnetic core arrays, and particularly in ones using only coordinate selection wires and not sets of selection wires as set forth in the above-mentioned Ashenhurst-Minnick application, one can advantageously employ what we shall refer to as a standard output arrangement in which the read-out wire threads the cores in a serpentine fashion, alternately of the same and opposite directions as the selection wires. With but two coordinate selection wires one can easily see which are the non-selected cores to which disturbing pulses are applied and in what relative directions the selection and read-out wires intersect these cores. When the number of cores in the matrix and the number of selection wires increase this cannot easily be seen. In the Ashenhurst-Minnick application a 5 x 5 matrix with four sets of selection wires is disclosed, employing the standard serpentine output arrangement. In the Minnick application, referred to above, an 11 x 11 matrix with six sets of selection wires is disclosed.

Figure 1:
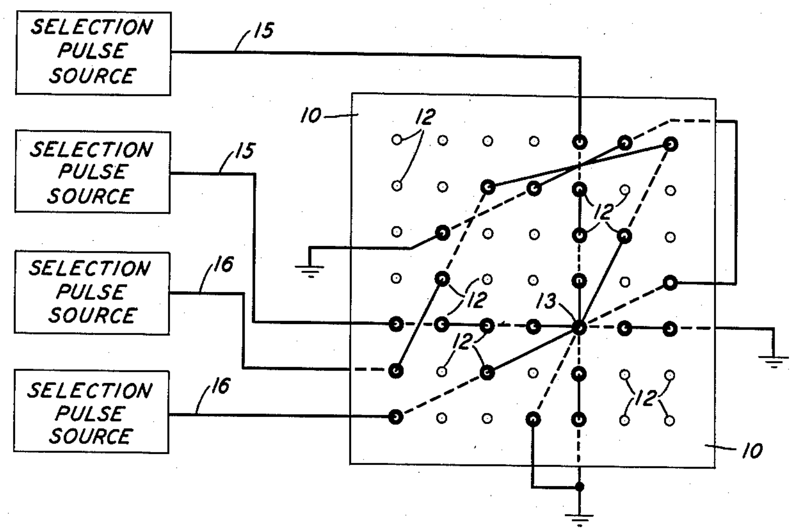
Fig. 1 is a partial schematic representation of a 7 x 7 magnetic core matrix employing four sets of selection wires, the selection wires for only one core in the matrix being depicted and being threaded through the matrix in accordance with the teaching of the above-mentioned Ashenhurst-Minnick application.

This complexity can best be seen if we consider four selection wires threading but one core in a 7 x 7 matrix of the type disclosed in the Ashenhurst-Minnick application. This is depicted in Fig. 1 wherein the matrix is assumed to be of the types disclosed in the above-mentioned applications wherein the cores are mounted in a sheet 10, either of magnetic material integral with the magnetic material defining the cores or of insulating material supporting the magnetic material defining the cores. The magnetic cores 12 through which only one of the selection wires 15 and 16 pass are in darker outline than those not involved in the selection or sensing of the single core 13. As can be seen of the forty-nine cores in the array, twenty-four cores are intersected by a single selection wire 15 or 16 having a disturbing pulse thereon in addition, of course, to the selected core; further there would be more non-selected but disturbed cores if additional selection wires were employed.

To understand the novel teaching and concepts of applicant's invention whereby, in this embodiment, the summation of the total number of error pulses on the single read-out wire is minimal regardless of the selected core and therefore of the particular disturbed cores, it will be advisable to introduce several terms and notations. In this way the applicability of applicant's invention to the general case of an $n$ by $n$ matrix having $p$ selection wires can more readily be seen. The three terms to be defined first are the selection array S, the output array Q, and the product array P. Let us define the binary quantities "1" and "0" so that a "1" means that the wire is being threaded through the sheet 10 from on top, considering the cores to be threaded in succession from the selection pulse sources to ground; thus a core intersected by a wire into the paper in Fig. 1 will have a value "1." Similarly a core threaded by a wire coming up through the sheet 10 or out of the paper will have a value "0."

The selection array S defines in which direction the selection wires 15 and 16 are threaded in each core in the array. As we recall, in the arrangement of selection wires disclosed in the Ashenhurst-Minnick application and repeated, for one core, in Fig. 1 of this drawing, the selection wires all thread any one core in the same direction and these selection wires include cooordinate wires 15 which thread successive cores in the rows and columns of the array. As these coordinate wires 15 must thread the cores alternately, i. e., entering the sheet at one core and emerging at the next, etc., the selection array itself will comprise alternate "1's" and "0's." Accordingly, we can define the selection array as follows, assuming that the selection wires are threaded into the first core on the left of the first row of the matrix:

$$S=\begin{matrix}1&0&1&0&1&0&1\\0&1&0&1&0&1&0\\1&0&1&0&1&0&1\\0&1&0&1&0&1&0\\1&0&1&0&1&0&1\\0&1&0&1&0&1&0\\1&0&1&0&1&0&1\end{matrix} \quad (1)$$

The position of the binary "1" or "0" in the array is the same as the position of the core in the matrix. Any pierced matrix of magnetic cores, of the types of the above-mentioned applications, will have a selection array of this type.

Just as an array is associated with the direction of the intersection of the selection wires with the cores of the matrix, so another array, termed the output array Q, is associated with the direction of the output wire through each core. Again a "1" in the array means the output or read-out wire is threaded into the core and a "0" that it is threaded out of the core. As an example let us consider the standard output wire arrangement depicted in Fig. 2, which has been priorly utilized in pierced magnetic core matrices. In this serpentine wiring arrangement the output wire 18 is arranged alternately to thread the cores in the same and opposite directions as the selection wires; as pointed out above this would effectively cancel the induced error pulses on the read-out wire due to the disturbed pulses at the non-set cores if only the coordinate selection wires 15 were utilized. The output wire 18 is connected to a detector circuit 19 and we will consider that it enters the matrix at the first core on the left of the first row, as indicated by the arrow.

The output array Q for this arrangement of the output wire 18 can therefore be defined as follows:

$$Q=\begin{matrix}1&1&0&0&1&1&0\\0&1&1&0&0&1&0\\0&0&1&1&0&1&1\\1&0&0&1&0&0&1\\1&1&0&1&1&0&0\\0&1&0&0&1&1&0\\0&1&1&0&0&1&1\end{matrix} \quad (2)$$

There remains to be defined now the product array P. This can be defined mathematically by considering that the elements of the S and Q arrays are respectively $s_{ij}$ and $q_{ij}$. Then the product array P comprises the elements $p_{ij}$ defined by the expression $$p_{ij}=s_{ij}q_{ij}+s'_{ij}q'_{ij} \quad (3)$$

where the prime denotes the binary inverse. Or we can define the elements of the product array in these terms; if the selection wires and the read-out wires thread a core in the same direction, the element of the product array corresponding to that core in the matrix is "1" and if in opposite directions the element of the array corresponding to that core in the matrix is a zero.

Figure 2:
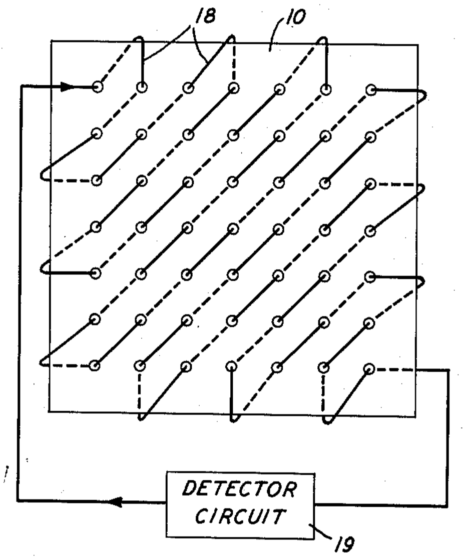
Fig. 2 is a schematic representation of the threading of a single read-out wire through each of the cores of the matrix of Fig. 1 in accordance with the prior art.

Accordingly, if the selection array for Fig. 1 and the output array for Fig. 2 are utilized in a core matrix the product array would be $$P=\begin{matrix}1&0&0&1&1&0&0\\1&1&0&0&1&1&1\\0&1&1&0&0&0&1\\0&0&1&1&1&0&0\\1&0&0&0&1&1&0\\1&1&1&0&0&1&1\\0&0&1&1&0&0&1\end{matrix} \quad (4)$$

As a "1" in the product array indicates that the selection and output wires intersect that core in the same direction and a "0" in the opposite direction, the "1's" and "0's" in the product array P denote the relative polarities of the masking or error signals on the single output wire due to the various cores in the matrix. If a given storage location is chosen, as in Fig. 1, then the number of "1's" in P on the various selection wires minus the number of "0's," exclusive of the selected core, indicates the number of unbalanced error signals due to the non-selected cores.

It is not a simple matter, particularly as the number $p$ of sets selection wires and the size $n$ of the matrix become large, to see which are the disturbed cores when a particular core is selected. To indicate the scope of this particular problem let us consider the product array (4) above and the summation of the disturbing pulses when the core 13 is selected in the embodiment of Fig. 1. To do this we shall rewrite the product array underlining those elements of the array corresponding to the heavily outlined cores of Fig. 1, namely, those cores 12 having applied thereto one disturbing pulse by a selection wire on sensing of the core 13. The product array is now:

$$P=\begin{array}{ccccccc} 1 & 0 & 0 & 1 & 1 & 0 & 0 \\ 1 & 1 & 0 & 0 & \bar{1} & \bar{1} & \bar{1} \\ 0 & 1 & \bar{1} & \bar{0} & \bar{0} & 0 & 1 \\ 0 & \bar{0} & 1 & 1 & \bar{1} & \bar{0} & 0 \\ 1 & \bar{0} & 0 & 0 & \bar{X} & 1 & \bar{0} \\ \bar{1} & \bar{1} & \bar{1} & \bar{0} & \bar{0} & \bar{1} & \bar{1} \\ \underline{\bar{0}} & 0 & \bar{1} & \underline{1} & \underline{\bar{0}} & 0 & 1 \end{array} \quad (4a)$$

The element in the product array of Expression 4*a* corresponding to the selected core is marked by an X rather than a "0" or "1." As can be seen by a summation of the "0's" and "1's" there is an unbalance of six negative error pulses, i. e., of six pulses produced at cores designated "0" in this arary that are not canceled by positive pulses produced at cores designated "1" in this array. This gives an unbalanced error signal of 6/4 or 1.5 per set of selection wires. This is actually not too bad and can be utilized with cores defined by materials having good magnetic properties. However, it can be shown that for the standard product array and thus for the standard output wiring arrangement as shown in Fig. 2 the unbalanced error signal on the signal output wire per set of selection wires is between $-3.5$ and $+3.5$, where the minus and plus indicate excess of "0's" and "1's" in the product array, respectively. This relation is independent of the size $n$ of the matrix for these particular selection wires; however, actually for smaller matrices the unbalanced signal per set of selection wires is smaller than the maximum predicted by the general relationship stated above. Specifically, it can be shown that the maximum unbalanced error signal per set of selection wires for various size matrices having the four sets of selection wires shown in Fig. 1 is given by the following table, where $n$ of course indicates the size of the matrix:

For $n=5$, the error signal per set is between $-1$ and $+1$
For $n=7$, the error signal per set is between $-2$ and $+2$
For $n=9$, the error signal per set is between $-2$ and $+2$
For $n=11$, the error signal per set is between $-2$ and $+2.5$
For $n=13$, the error signal per set is between $-3$ and $+3$
For $n=15$, the error signal per set is between $-2$ and $+3$
For $n=17$, the error signal per set is between $-2.5$ and $+2$ As can be seen the maximum unbalanced signal per set of selection wires approaches but does not exceed the possible maximum values of $-3.5$ and $+3.5$ for larger matrices.

For other arrays than the standard output array and what we have referred to as the standard output winding arrangement, the maximum unbalanced signal per set of selection wires may be considerably worse. Further for other groups of selection wires it can be shown that the possible maximum unbalanced signal may be larger than $\pm 3.5$ per set of selection wires.

In accordance with this invention the output wiring arrangement and the output array are chosen so that when the error pulses induced on the read-out wire 18 are summed together, for any group of pulsed selection wires 15 and 16, there is a maximum of cancellation. Further it is an object of this invention to teach the art how to specify the output wiring arrangement to attain this. Specifically, it is a feature of this invention that this is attained by specifying the product array for any size matrix utilizing any number of sets of selection wires and any particular sets of selection wires.

It is a feature of this invention that the output wire be threaded through the cores of the matrix to intersect the cores in such a pattern that a particular product array is produced, which product array we shall refer to as the modular product array.

Specifically, in accordance with a feature of this invention the first row of the modular product array consists of $$\left[\frac{n+1}{2}\right] \text{“1's”}$$

and $$\left[\frac{n}{2}\right] \text{“0's”}$$

which may be arranged in that order, where the symbol [A] is to be read "the integral part of A." The second row of the modular product array is generated by the first row, cyclically shifted by a number of elements $s$ and specifically in one embodiment shifted to the left by one element of the array; the remaining rows are similarly formed. Thus for the case of $n=7$ the modular product array is, in this one embodiment, $$P=\begin{array}{ccccccc} 1 & 1 & 1 & 1 & 0 & 0 & 0 \\ 1 & 1 & 1 & 0 & 0 & 0 & 1 \\ 1 & 1 & 0 & 0 & 0 & 1 & 1 \\ 1 & 0 & 0 & 0 & 1 & 1 & 1 \\ 0 & 0 & 0 & 1 & 1 & 1 & 1 \\ 0 & 0 & 1 & 1 & 1 & 1 & 0 \\ 0 & 1 & 1 & 1 & 1 & 0 & 0 \end{array} \quad (5)$$

It can be shown that the range of the unbalanced signal per set of selection wires on the output wire due to disturbing pulses at non-selected cores for an output wire threaded through the matrix to give a modular product array is between $-1$ and $+1$, if $n$ is even, and between 0 and $+2$, if $n$ is odd, regardless of the size of $n$ and regardless of the number and particular sets of selection wires employed. Comparing this range with that of the standard product array it is readily apparent that its maximum limits are considerably smaller, which is particularly important and may in fact be crucial for very large matrices utilizing of the order of several hundred or thousands of cores for large scale memory.

The modular product array in accordance with this invention need not start with the $$\left[\frac{n+1}{2}\right] \text{“1's}$$

What is important to minimize the possible unbalanced signal is that there be that number of "1's" in the first row of the array and that the pattern thus established in the first row be repeated in each succeeding row, but shifted by a specified number of elements, as discussed further below. For example, other product arrays in accordance with this invention could have the pattern $$1\ 1\ 0\ 0\ 1\ 1\ 0\ 0\ \ldots \quad (6)$$

in the first row, which pattern is shifted for each succeeding row. For the cases where $n$ is defined by $4k+5$, $4k+7$, or $4k+8$, where $k=0, 1, \ldots$, this product array will also give the above-mentioned small bounds to the possible unbalanced signal on the output wire.

Similarly other product arrays in accordance with this invention could have the pattern $$1\ 0\ 0\ 1\ 1\ 0\ 0\ 1\ 1\ \ldots \quad (7)$$

for the first row, which pattern is again shifted for each succeeding row. For cases where $n$ is defined by $4k+6$ or $4k+8$, where $k=0, 1, \ldots$, this product array will also give the desired bounds to the possible unbalanced signal on the output wire.

Having chosen a modular product array in accordance with this invention, one can easily determine the output array, and thus the threading of the output wire through the matrix, by comparison of the product array with the selection array. This can be done by a visual comparison or mathematically by the relationship given in Equation 3 above. To illustrate the practice of this invention this shall be done for the specific matrix we have been considering, namely one in which $n=7$.

As stated above, the selection array S is given by

Expression 1 for any pierced type of matrix, which we shall still consider, and is $$S=\begin{matrix} 1&0&1&0&1&0&1\\ 0&1&0&1&0&1&0\\ 1&0&1&0&1&0&1\\ 0&1&0&1&0&1&0\\ 1&0&1&0&1&0&1\\ 0&1&0&1&0&1&0\\ 1&0&1&0&1&0&1 \end{matrix} \qquad (8)$$

In accordance with a feature of this invention the product array has a pattern of $$\left[\frac{n+1}{2}\right] \text{"1's"}$$

in the first row, which pattern we shall shift by one for each succeeding row. In this embodiment we shall take the product array whose first row is given by the pattern $$1\ 1\ 0\ 0\ 1\ 1\ 0\ 0\ 1\ 1\ 0\ 0\ \ldots \qquad (9)$$

giving the product array $$P=\begin{matrix} 1&1&0&0&1&1&0\\ 1&0&0&1&1&0&1\\ 0&0&1&1&0&1&1\\ 0&1&1&0&1&1&0\\ 1&1&0&1&1&0&0\\ 1&0&1&1&0&0&1\\ 0&1&1&0&0&1&1 \end{matrix} \qquad (10)$$

By comparison of P, Expression 10 and S, Expression 8, we can determine the output array Q, which is given by $$Q=\begin{matrix} 1&0&0&1&1&0&0\\ 0&0&1&1&0&0&0\\ 0&1&1&0&0&0&1\\ 1&1&0&0&0&1&1\\ 1&0&0&0&1&1&0\\ 0&0&0&1&1&0&0\\ 0&0&1&1&0&0&1 \end{matrix} \qquad (11)$$

With Expression 11 as our guide, the actual threading of the output wire through the cores of the matrix becomes simply a question of threading successive cores so as to economize on the length of the output wire between these successive cores; the difficult problem of the direction in which the output wire intersects or threads the core has been resolved by Expression 11.

Figure 3:
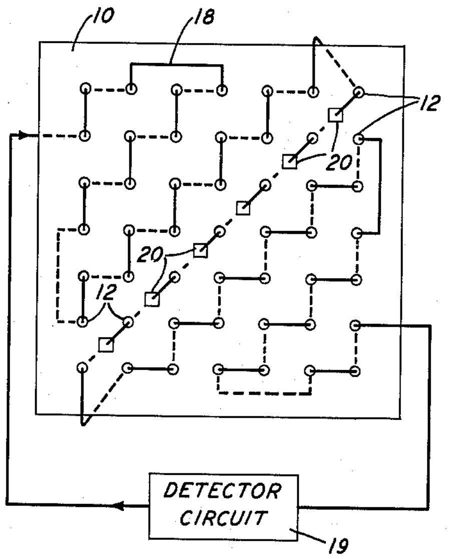
Fig. 3 is a schematic representation of the threading of a single read-out wire through each of the cores of the matrix of Fig. 1 in accordance with one illustrative embodiment of this invention.

Fig. 3 is one wiring schematic for the output array Q of Expression 11. In this embodiment the output or read-out wire 18 is threaded through each core starting, as indicated by the arrow, at the core in the first column of the second row. Because for this matrix $n$ is an odd number, it is desirable to thread the output wire through each core along the diagonal of the matrix. As the diagonal elements of the output array all have the same value, it is necessary for the read-out wire 18 to thread each core in the same direction; accordingly a set of extra holes 20, indicated as square holes in the figure, extend through the element or elements defining the matrix and are threaded only by the output wire 18. Obviously the holes 20 need not define magnetic cores. Except for the diagonal cores and certain cores at the edges of the matrix, successive cores intersected by the read-out wire have opposite values in the output array.

For this particular array and the particular core selected, as depicted in Fig. 1, let us consider the summation of the error pulses on the output wire 18 in Fig. 3. This can most readily be done by considering the product array P, with those elements underlined that have a disturbing pulse applied thereto and therefore contribute an error pulse to the read-out wire; again the actual core selected appears at X.

$$P=\begin{matrix} 1&1&0&0&\underline{1}&\underline{1}&\underline{0}\\ 1&0&\underline{0}&\underline{1}&\underline{1}&0&1\\ 0&\underline{0}&1&1&\underline{0}&\underline{1}&1\\ 0&\underline{1}&1&0&\underline{1}&1&\underline{0}\\ \underline{1}&\underline{1}&\underline{0}&\underline{1}&\underline{X}&\underline{0}&\underline{0}\\ \underline{1}&0&\underline{1}&1&\underline{0}&0&1\\ \underline{0}&1&1&\underline{0}&\underline{0}&1&1 \end{matrix} \qquad (12)$$

In this case there is a complete cancellation of the error pulses. This will not always occur; however, the maximum possible unbalanced signal per set of selection wires is between 0 and $+2$ when $n$ is an odd number, as discussed above, and this is true regardless of the size of the matrix or the number of selection wires.

In the above discussion and example, the product array has been defined by shifting the modular pattern of the first row one core or element to the left for each succeeding row. It is an aspect of this invention, however, that the pattern of the first row may be successively shifted, either to the right or to the left, by any of a number of cores; the major requirement is that the amount of the shift be a prime number relative to $n$. If we consider the amount of the shift to be $s$, then $s$ and $n$ are relatively prime. In many cases, however, the simplest wiring arrangement for the read-out wire will be for the case $s=1$.

Advantageously, each selection wire is threaded through the cores of the matrix so that no two selection wires jointly thread any two cores, as described in detail in the above-mentioned Ashenhurst-Minnick application.

Further, in order to attain the minimum unbalanced signal in accordance with this invention, the amount of the shift $s$ should also be related to the particular selection wires utilized in the array. Specifically, as priorly described in the above-mentioned Ashenhurst-Minnick application, each set of selection wires can be defined by a pair of numbers $(a, b)$, where $a$ is the distance between successive cores threaded by the wire in the $a$ coordinate direction and $b$ is the distance between successive cores threaded by the wire in the $b$ coordinate direction. Further, each selection wire, except the (0, 1) and (1, 0) wires, which are the coordinate selection wires, threads only one core in each row and column of the matrix. Accordingly, we can consider each set of wires other than the coordinate selection wires to be defined by the pair of numbers $(t, 1)$ where, starting at any core threaded by a selection wire, we determine the distance $t$ in the $a$ coordinate direction to the core in the next row in the $b$ coordinate direction that is also threaded by that selection wire; $t$ will be counted modulo $n$. $t$ is thus the distance between two cores in the $a$ coordinate direction threaded by the same selection wire which are separated by a distance of unity in the $b$ coordinate direction; it should be pointed out that these two cores need not be threaded successively by the same wire.

To obtain minimum unbalanced error signal in accordance with this invention, each set of selection wires which is defined by a pair of numbers $(t, 1)$ should be chosen such that the value $(t-s)$ is a prime number relative to $n$. It may be noted that if $s$ is chosen as unity, and if $n$ is prime, $t$ may take any values between 0 and $n-1$ except unity.

The above discussion has been directed primarily towards magnetic core matrices of the pierced core type wherein the cores are either defined by holes through a pierced sheet of magnetic material or by laminations of thin toroidal wafers mounted on insulating cards and the wires intersecting these cores comprise a single turn threaded through the cores. However, the advantages of read-out wiring arrangements in accordance with this invention are equally applicable to matrices in which the cores are distinct toroids of magnetic materials and in which each wire threading or intersecting a core comprises a few or more turns around the toroid. It is apparent wherein these wires wound around the toroidal cores have a direction of threading or of intersection with the cores in the same manner as the single wire through the core and wherein the above discussion is equally applicable to this structure.

It is to be understood that the above-described arrangements are illustrative of the principles of the invention and are intended merely to teach the invention so that the art may utilize it in the threading of magnetic core matrices and particularly in the threading of large matrices where techniques of observation or simple analysis of the problem of obtaining maximum cancellation of disturbed pulses on the output lead for any selected core are not possible. Numerous other output arrays and wiring arrangements may be devised by those skilled in the art without departing from the spirit, scope, and teaching of the invention.

What is claimed is:

1. A magnetic core matrix comprising a plurality of magnetic cores in an $n$ by $n$ array, where $n$ is any integer, a plurality of selection wires intersecting each of said cores, all of the selection wires intersecting any one core being in the same direction, and a single read-out wire intersecting all of said cores, said read-out wire intersecting said cores of the first row of the array such that the direction of the read-out wire through said cores is the same for the integral part of $$\frac{(n+1)}{2}$$

cores and the opposite for the remainder of the cores of said first row and the pattern thus established in said first row is repeated in each succeeding row but successively shifted by $s$ cores, where $s$ and $n$ are relatively prime.

2. A magnetic core matrix in accordance with claim 1 wherein said pattern of said first row is repeated in each succeeding row but shifted by one core.

3. A magnetic core matrix in accordance with claim 2 wherein each succeeding row is shifted by one core to the left.

4. A magnetic core matrix in accordance with claim 1 wherein no two selection wires intersecting any one core jointly intersect any other of said cores in said matrix and each of said selection wires intersecting said one core other than the coordinate selection wires is defined by a pair of numbers $(t, 1)$, the amount of said shift $s$ being related to the number $t$ defining each of said selection wires such that for each $t$ $(t-s)$ and $n$ are relatively prime.

5. A magnetic core matrix comprising a plurality of magnetic cores in an $n$ by $n$ array, where $n$ is any integer, a plurality of selection wires threading each of of said cores, all of the selection wires threading any one core threading that core in the same direction, and a single read-out wire threading all of said cores, said read-out wire threading said cores of the first row of said array such that the direction of the read-out wire through the first $$\left[\frac{n+1}{2}\right]$$

cores of said row is the same as the direction of the selection wires through said cores and the direction of the read-out wire through the remainder of said cores of said row is the opposite of the direction of the selection wires through said cores, the pattern thus established in said first row being repeated in each succeeding row but successively shifted by $s$ cores where $s$ and $n$ are relatively prime.

6. A magnetic core matrix in accordance with claim 5 wherein the pattern thus established in said first row is repeated in each succeeding row but shifted by one core.

7. A magnetic core matrix in accordance with claim 5 wherein each of said selection wires other than the coordinate selection wires is defined by a pair of numbers $(t, 1)$ and for each of said selection wires $(t-s)$ and $n$ are relatively prime.

8. A magnetic core matrix comprising a plurality of magnetic cores in an $n$ by $n$ array, where $n$ is any integer equal to or larger than four, a plurality of selection wires intersecting each of said cores, all of the selection wires intersecting any one core intersecting that core in the same direction, and a single read-out wire intersecting all of said cores, said read-out wire intersecting said cores in the first row of said array in accordance with the pattern 1 1 0 0 1 1 0 0 . . . where a "1" indicates that the read-out wire intersects the core in the same direction as the selection wire and a "0" that it intersects the core in the opposite direction to the selection wires and the pattern thus established in said first row being repeated in each succeeding row but successively shifted by $s$ cores, where $s$ and $n$ are relatively prime.

9. A magnetic core matrix in accordance with claim 8 wherein said pattern is shifted by one core in each succeeding row.

10. A magnetic core matrix in accordance with claim 9 wherein said pattern is shifted by one core to the left in each succeeding row.

11. A magentic core matrix in accordance with claim 8 wherein each of said selection wires other than the coordinate selection wires is defined by a pair of numbers $(t, 1)$ and for each of said selection wires $(t-s)$ and $n$ are relatively prime.

12. A magnetic core matrix comprising a plurality of magnetic cores in an $n$ by $n$ array, where $n$ is any even integer equal to or larger than four, a plurality of selection wires intersecting each of said cores, all of the selection wires intersecting any one core intersecting that core in the same direction, and a single read-out wire intersecting all of said cores, said read-out wire intersecting said cores in the first row of said array in accordance with the pattern 1 0 0 1 1 0 0 1 1 . . . where a "1" indicates that the read-out wire intersects the core in the same direction as the selection wire and a "0" that it intersects the core in the opposite direction to the selection wires and the pattern thus established in said first row being repeated in each succeeding row but successively shifted by $s$ cores, where $s$ and $n$ are relatively prime.

13. A magnetic core matrix in accordance with claim 12 wherein said pattern is shifted by one core in each succeeding row.

14. A magnetic core matrix in accordance with claim 12 wherein each of said selection wires other than the coordinate selection wires is defined by a pair of numbers $(t, 1)$ and for each of said selection wires $(t-s)$ and $n$ are relatively prime.

No references cited.